(12) United States Patent
Doganis et al.

(10) Patent No.: US 12,067,739 B2
(45) Date of Patent: Aug. 20, 2024

(54) METHOD FOR 3D SCANNING OF A REAL OBJECT

(71) Applicant: DASSAULT SYSTEMES, Velizy Villacoublay (FR)

(72) Inventors: Fivos Doganis, Velizy Villacoublay (FR); Ariane Jourdan, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 499 days.

(21) Appl. No.: 17/377,014

(22) Filed: Jul. 15, 2021

(65) Prior Publication Data
US 2022/0028100 A1 Jan. 27, 2022

(30) Foreign Application Priority Data

Jul. 22, 2020 (EP) .................................... 20305844

(51) Int. Cl.
*G06T 7/55* (2017.01)
*G01B 11/25* (2006.01)
(Continued)

(52) U.S. Cl.
CPC ............ *G06T 7/55* (2017.01); *G01B 11/2518* (2013.01); *G06T 7/73* (2017.01); *G06T 15/06* (2013.01); *G06T 2207/10028* (2013.01)

(58) Field of Classification Search
CPC ................. G01B 11/2518; G06T 15/06; G06T 2207/10016; G06T 2207/10028; G06T 7/55; G06T 7/73
See application file for complete search history.

(56) References Cited

U.S. PATENT DOCUMENTS

| 2015/0062120 A1* | 3/2015 | Reisner-Kollmann ....................... G06T 19/006 345/419 |
| 2018/0124378 A1* | 5/2018 | Forutanpour ............. G06T 7/50 |

(Continued)

OTHER PUBLICATIONS

Lewis, M. and Oswald, C.: Can an Inexpensive Phone App Compare to Other Methods When It Comes to 3D Digitization of Ship Models, Int. Arch. Photogramm. Remote Sens. Spatial Inf. Sci., XLII-2/W10, 107-111, https://doi.org/10.5194/isprs-archives-XLII-2-W10-107-2019, 2019 (Year: 2019).*

(Continued)

*Primary Examiner* — Michael J Vanchy, Jr.
(74) *Attorney, Agent, or Firm* — Oblon, McClelland, Maier & Neustadt, L.L.P.

(57) ABSTRACT

A computer-implemented method for 3D scanning of a real object with a camera having a 3D position including receiving, from the camera, an image of the real object, displaying on a screen, in an augmented reality view, the image of the real object enclosed within a virtual 3D box and, superimposed to the real object, a virtual structure made of a set of planar tiles, and being anchored to the virtual 3D box, each tile corresponding to a predetermined pose of the camera, detecting that a tile is pointed at with the camera; acquiring, from the camera, a frame of the virtual 3D box, thereby validating said tile, said frame being a projection of the virtual 3D box on the image, iterating for different 3D positions of the camera, until a sufficient number of tiles is validated for scanning the real object, and implementing a 3D reconstruction algorithm with all captured frames.

13 Claims, 4 Drawing Sheets

(51) Int. Cl.
   *G06T 7/73*   (2017.01)
   *G06T 15/06*  (2011.01)

(56) References Cited

U.S. PATENT DOCUMENTS

2019/0197786 A1* 6/2019 Molyneaux .............. G06T 7/50
2020/0372626 A1* 11/2020 Dal Mutto ............. G06T 17/00

OTHER PUBLICATIONS

Ahmadyan et al.—"Real-Time 3D Object Detection on Mobile Devices with MediaPipes", Google ALBlog, Mar. 11, 2020, 6 pages.
M.-P Cani et al.—"Symmetry in 3D Geometry: Extraction and Applications", Eurographics Jan. 1, 2012, STAR—State of the Art Report. , 24 pages.
Peters—"Entwicklung eines VR-Shops mit 3D-Replikaten realer Objekte". Dec. 31, 2016, XP055746351, 90 pages (with English Abstract).
Lewis et al.—"Can an Inexpensive Phone App Compare to Other Methods When It Comes to 3d Digitization of Ship Models", The International Archives of the Photogrammetry, Remote Sensing and Spatial Information Sciences, vol. XLI-2/W10, 2019 Underwater 3D Recording and Modelling "A Tool for Modem Applications and CH Recording". Apr. 17, 2019, Limassol, Cyprus, 6 pages.
Search Report dated Nov. 23, 2020 issued in corresponding European patent application No. 20305844.1, 8 pages.

* cited by examiner

METHOD FOR 3D SCANNING OF A REAL OBJECT

CROSS-REFERENCE TO RELATED APPLICATIONS

This application claims priority under 35 U.S.C. § 119 or 365 to European Application No. 20305844.1, filed Jul. 22, 2020. The entire contents of the above application(s) are incorporated herein by reference.

The disclosure pertains to the field of 3D content creation. It relates more particularly to a method for 3D scanning of a real object. Hereafter, 3D scanning refers to a process of acquiring the shape and external appearance of a real object, to create a virtual 3D counterpart. This process is equally called 3D digitization and 3D capture, 3D scanning of a real object may be applied to fields such as Computer Aided Design (CAD), and also 3D printing.

BACKGROUND

In order to scan an object (covering a wide range of sizes, from everyday objects to parts of the Earth's surface such as a mountain chain), it has been suggested, since decades, to use the photogrammetry technique. The photogrammetry technique is based on the principle of correlation of images acquired from different points of view, by automatically recognizing corresponding points. To that end, the user takes as many pictures as possible by moving around the object to scan. The user does not know exactly how many pictures have to be taken, how much time will be dedicated to the acquisition of pictures, nor does he know from which position the pictures have to be taken. Once the pictures have been acquired, they will be sorted. Some of them will be considered useful, with enough detail, good lighting and sufficient overlap, among others, and some other pictures will be ignored, as being blurry, having too much or not enough overlap, or taken under bad so lighting conditions. Then, the user lets an algorithm entirely create the 3D model, without any further control from the user. Therefore, this task of 3D scanning may be tedious and frustrating for the user since the quality of its outcome is uncertain.

3D scanning applications such as "Qlone 3D Scanner", developed by EyeCue Vision Tech, take advantage of Augmented Reality (AR) technologies to scan objects in a user-friendly way. AR technologies allow virtual objects to be overlaid on a real scene, captured by the camera. The virtual objects seem to be anchored in the real-world, as the pose of the user in the real world is updated by the AR system and the pose of the virtual objects are updated accordingly.

In the aforementioned 3D scanning applications the user prints a checkerboard, which serves as a tracking marker, on a sheet of paper, places the object in the middle of the checkerboard and opens the application. The tracking marker allows for quicker algorithm resolution, so the results can be displayed almost directly after capture. The user lays the object on the tracking marker, and launches the application. The object then appears, surrounded by a dome, which is built up out of hundreds of segments. The user rotates around the object (or he makes the object rotate on a rotating support) until all the segments have been cleared. The application needs printing a checkerboard, so the user needs to carry around a marker or have a printer available, which is very inconvenient. Moreover, the dome has to fit the dimensions of the tracking marker (the height of the dome is equal to the length of the tracking marker), so another limitation is the height of the objects which can be scanned: scanning larger objects implies printing larger tracking markers, which can be hardly done beyond the A3 format using standard office printers.

Other 3D scanning applications, which are commercially available under the name "Scandy Pro 3D Scanner" or "itSeez3D", make the 3D scanning process quite easy, and do not need any printed medium. These applications require the use of a specific camera called RGB-D camera, which stands for "Red/Green/Blue-Depth". A RGB-D camera simultaneously provides a color image and a depth map (based on known patterns such as the pattern of a face) characterizing the distance of the object which is seen in the image. However, RGB-D cameras are not available on all the smartphones and tablets, but only on some of the latest ones.

Therefore, there is a need for providing a method for 3D scanning of a real object, which is user friendly, which is compatible with standard cameras, and which is able to scan large objects.

SUMMARY

An object of the present disclosure is a computer-implemented method for 3D scanning of a real object with a camera having a 3D position, if comprising the steps of:
  a) receiving, from the camera, an image of the real object;
  b) displaying on a screen, in an augmented reality view, the image of the real object enclosed within a virtual 3D box and, superimposed to the real object, a virtual structure made of a set of planar tiles, and being anchored to the virtual 3D box, each tile corresponding to a predetermined pose of the camera;
  c) detecting that a tile is pointed at with the camera;
  d) acquiring, from the camera, a frame of the virtual 3D box, thereby validating said tile, said frame being a projection of the virtual 3D box on the image;
steps a) to d) being iterated for different 3D positions of the camera, until a sufficient number of tiles is validated for scanning the real object;
  e) implementing a 3D reconstruction algorithm with all the captured frames.

BRIEF DESCRIPTION OF THE DRAWINGS

Additional features and advantages of the present disclosure will become apparent from the subsequent description, taken in conjunction with the accompanying drawings.

DETAILED DESCRIPTION

Figure 1:
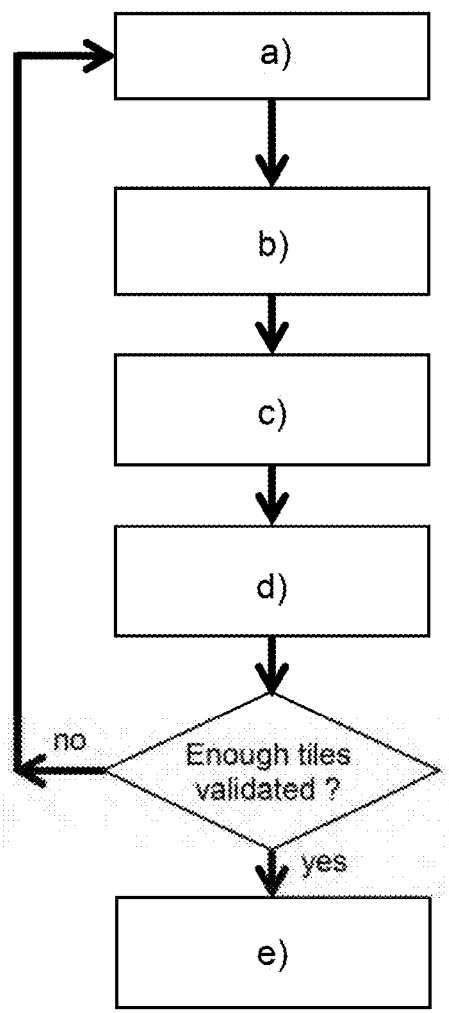
FIG. 1 is a flow-chart of the method according to the disclosure.

FIG. 1 illustrates the main steps of the invented method.

Throughout the process, the user holds a camera of a hand held device, which is compatible with an augmented view. For example, the hand held device may be a Smartphone, or a tablet, equipped with a screen and a camera so as to display on the screen the acquired images. Thanks to the invented method, the user is guided from one pose of the camera CAM to the other, by following the visual indications of a wizard, as it will be explained below.

An object OBJ which is to be scanned is provided in a real environment. In the example which is illustrated in the figures, the object which is to be scanned is a teddy bear, which is laid on a table. In a first step a), an image IM of the real object OBJ is received from the camera CAM. The pose of the camera CAM relative to the pose of the object OBJ may be obtained by calibrating and registering the camera CAM, i.e. by determining the intrinsic and extrinsic parameters of the camera. By knowing those parameters, the transformation (rotation/translation) of a 3D point of the 3D scene into a pixel in the corresponding captured image can be computed.

In a second step b) of the method, in an augmented reality view, the image IM of the real object OBJ is displayed on the screen, in real time. Since the camera is calibrated, the object may be surrounded by a virtual 3D box VBO (a rectangular cuboid) which encloses the object OBJ, and when the user moves around the object OBJ, the orientation of the virtual 3D box VBO is modified accordingly. The virtual 3D box VBO is superimposed to the real object OBJ in the augmented view which is enabled by the hand held device. The virtual 3D box VBO may be positioned and scaled in the augmented reality view, so that the symmetry of the virtual 3D box VBO fits with the potential symmetry of the object OBJ. However, this condition is not essential for carrying out the method.

Placing the virtual 3D box VBO accurately in 3D scene can be difficult, especially when considering typical user input which consists in 2D interactions on the surface of a tablet or inaccurate mid-air hand gestures in the case of devices such as augmented reality head-mounted display smart glasses.

Moreover, it can be noted that most of the time, objects to scan are placed on a flat surface. Therefore, in an embodiment, step a) comprises detecting, in the image IM, a horizontal plane PLA where the real object OBJ lies, and instructing the user to position the virtual 3D box VBO on said plane PLA. By using the constraint of the detected plane, the user is assisted when placing the virtual 3D box VBO in the 3D scene.

The plane may be detected, tracked and displayed, for example (and non-exclusively), by using the ARKit software development kit, which runs on iOS devices, and which is dedicated to augmented reality applications.

The user may be invited to pick a point on a visible portion of the flat surface close to the object OBJ to scan. The virtual 3D box VBO is then created near the point defined by the user and may be modified to fit the object to scan.

The virtual 3D box VBO can be adjusted by using intuitive gestures. When using a smartphone, the virtual 3D box VBO can be translated by simply touching it and moving the finger across the screen. The movement is constrained by the detected plane detected previously for easier manipulation. The virtual 3D box VBO can therefore be easily dragged on a surface and overlaid on top the object to scan.

Figure 2:
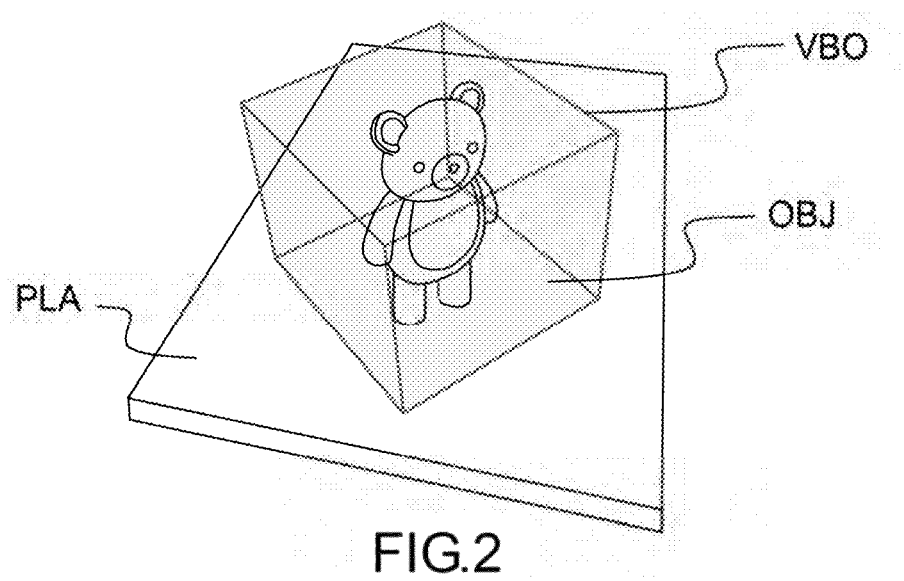
FIG. 2 illustrates an augmented view of the real object enclosed by a virtual 3D box.

A virtual grid, which can be seen on FIG. 2, can be placed on the plane where the box is placed, to help the user even further. Such a visual feedback helps anchoring virtual objects on top of the real world by providing scale and perspective. It can also help to determine if the plane has been accurately detected by checking the alignment of the grid and the real plane.

The virtual 3D box VBO can also be rotated by using a rotation handle which can be represented as an arc, close to the virtual 3D box VBO, in particular below it. The user drags the rotation handle on one side or the other of the arc. This is especially useful when the shape of the objet OBJ to scan is close to a box, in which case the edges of the real shape and the virtual box should be as aligned as possible for a better fit and to match potential symmetry planes.

The size of the virtual 3D box VBO can also be changed. One possible implementation of this capability, when using a smartphone screen, is to tap and hold a face to modify it. The face will change its color and it will be disconnected from the rest of the cube, so that it can be translated along its normal. When releasing the face, the box is rebuilt by taking into account the new position of the face, resulting in a bigger or smaller box, according to the gestures of the user.

By moving slightly around the object, the user can iteratively adjust the box as described above, so that the object to capture fits as tightly as possible inside, while leaving some room to take into account the unavoidable inaccuracies of the tracking.

In case the object is not placed on a plane, a virtual box can still be created and adjusted, but the process might be longer. Indeed, without a physical plane providing helpful constraints, the user will have to move around the object to adjust all faces individually. For example, in the case of a lamp shade hanging from the ceiling, the user will have to roughly position the virtual box on top of the lamp shade, and then move around to ensure all parts of the lamp shade fit inside the box, by adjusting all faces in all x, y and z directions.

Instead of manually providing the virtual 3D box VBO enclosing the object in the augmented view, the virtual 3D box VBO could be automatically provided.

Indeed, many machine learning object detection algorithms (for example based on classification) can provide a bounding rectangle of every object detected in an image. The user could simply select (by touch, speech, gaze or simply by pointing the camera) the object to reconstruct. The virtual 3D box VBO could then be centered on the intersection between the middle of the basis of the bounding rectangle and the plane. Two of the three dimensions of the virtual 3D box VBO are already known. The user would only have to adjust one dimension (the depth), and may be rotate the box for better alignment. The rotation could even be replaced by moving around the object and relying on machine learning to adjust iteratively the virtual 3D box VBO.

Recent advances in machine learning can go one step further, by providing a 3D bounding box (as disclosed in the article 3*D Bounding Box Estimation Using Deep Learning and Geometry*, Arsalan Mousavian et al., CVPR 2017), or even an approximation of the shape of the object, when the object belongs to a known class (as disclosed in the article "Mesh R-CNN", Georgia Gkioxari et al., 2019 IEEE/CVF International Conference on Computer Vision ICCV).

Alternatively, the virtual 3D box VBO may be automatically provided by using computer vision. Some augmented reality libraries can detect 3D points corresponding to notable features in the real environment, resulting in a more or less dense 3D point cloud. If there are enough points, a virtual 3D box VBO could be automatically computed when the user points on an object to capture.

Figure 6:
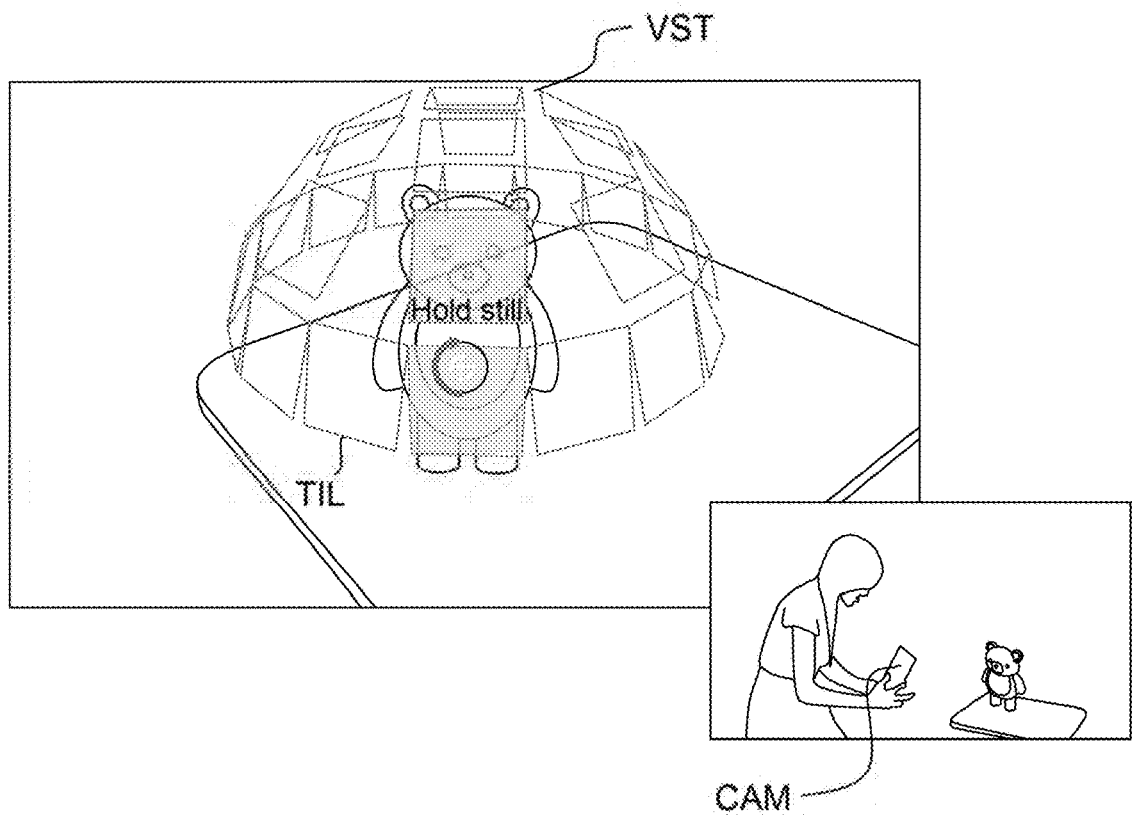
FIG. 6 illustrates a screenshot of the augmented reality view, along with a view of a user capturing frames.

During step b) of the invented method, a virtual structure VST made of a set of planar tiles TIL and being anchored to the virtual 3D box VBO is also displayed in the augmented reality view, as illustrated for example by FIG. 6. The tiles are planar and preferably rectangular. The arrangement of the tiles TIL is laid around the virtual 3D box VBO, each tile TIL corresponding to a predetermined pose of the camera CAM. Therefore, by pointing at each tile with the camera, while having the whole virtual 3D box VBO in the field of view of the camera, the user takes exactly one valid image in order to have a fast reconstruction of the object, with a good 3D reconstruction quality.

In a third step c), it is detected that a tile TIL is pointed at with the camera CAM. The user tends naturally to have an incorrect pointing of the tile (not exactly perpendicular to the tile), so the user may move slightly the camera CAM before exactly pointing at the tile TIL If the tile TIL is pointed at, a frame of the virtual 3D box VBO is acquired, which validates the tile TIL (step d). The frame is a projection of the virtual 3D box VBO on the image IM. Depending on the reconstruction algorithm, only the projection of the virtual 3D box VBO may be processed, instead of the whole 3D scene which is visible on the image. Therefore, the maximum volume to scan is precisely defined, and the reconstruction algorithm can focus on the details inside that volume instead of trying to reconstruct the whole scene. The virtual 3D box VBO projects into the frame that would be captured, and this can be verified by projecting each of the bounding box's corner points into the camera's frame and checking that the resulting projected points' coordinates fit into the known frame size. This ensures that the model to scan is entirely visible in the captured frame, and not accidentally cropped because of the user aiming badly.

In order to acquire frames, and to detect if the camera is correctly positioned and oriented with respect to the object, a ray is cast from the camera. When there is a collision between the ray and a non-validated tile, an angle between the ray and the normal direction of the non-validated tile is computed, and the tile is validated if the angle is smaller than a predetermined value. The inventors have found that a predetermined value which is comprised between 15 and 25 degrees is well-suited. In particular, a predetermined value of approximately 18 degrees, which corresponds to a cosine of 0.95, is particularly well-suited, since it provides enough accuracy without being too frustrating to reach. Closeness of the ray's orientation to the tile's normal direction can also be measured by the dot product between both directions, which has to be higher than a threshold value. Pointing at a tile with an orientation close to its normal direction ensures that the captured frame will represent a point of view close to the one defined by the pose of the tile, and therefore ideal for the latter 3D reconstruction.

In an embodiment, the ray is periodically cast at a predetermined time interval. Therefore, the user does not need to press any button of the hand held device, or to touch the screen, during the scanning process, and the user can hold the camera with both hands, which increases the stability of the acquired frames. The periodicity of the ray casting may be embodied by the display of a timer on the screen, such as a progress bar.

A visual indicator such as a target may be displayed in the middle of the screen, which corresponds to the optical axis of the camera, as illustrated by FIG. 6. When the visual indicator is in a tile, the timer is displayed.

Steps a) to d) are then iterated for different 3D positions of the camera CAM, until a sufficient number of tiles is validated for scanning the real object OBJ. Then, in step e), a 3D reconstruction algorithm is implemented with all the captured frames. In embodiment, the reconstruction algorithm is a 3D carving algorithm, and the position of the tiles of the virtual structure VST is determined accordingly. The carving algorithm needs few but very distinct poses. The principle of carving is explained in the article "*A Theory of Shape by Space Carving*" (Kiriakos N. Kutulakos et al., International Journal of Computer Vision 38(3), 199-218, 2000). Each frame is used to "carve" the 3D model.

Figure 3:
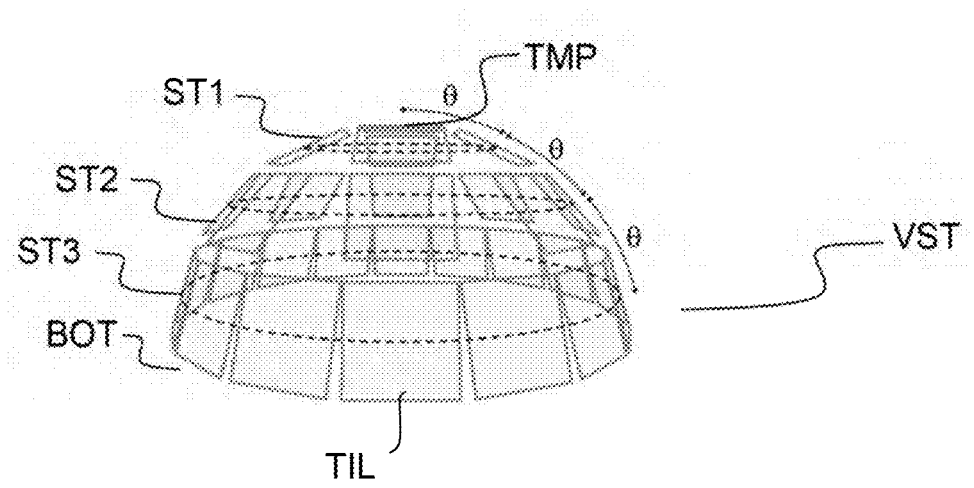
FIG. 3 illustrates an example of the virtual structure from a perspective view.
Figure 4:
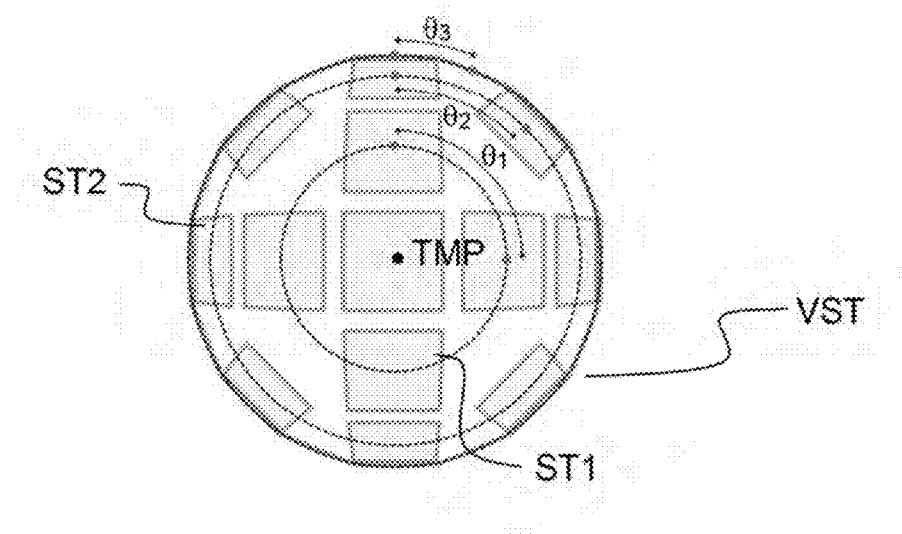
FIG. 4 illustrates an example of the virtual structure from a top view.
Figure 5:
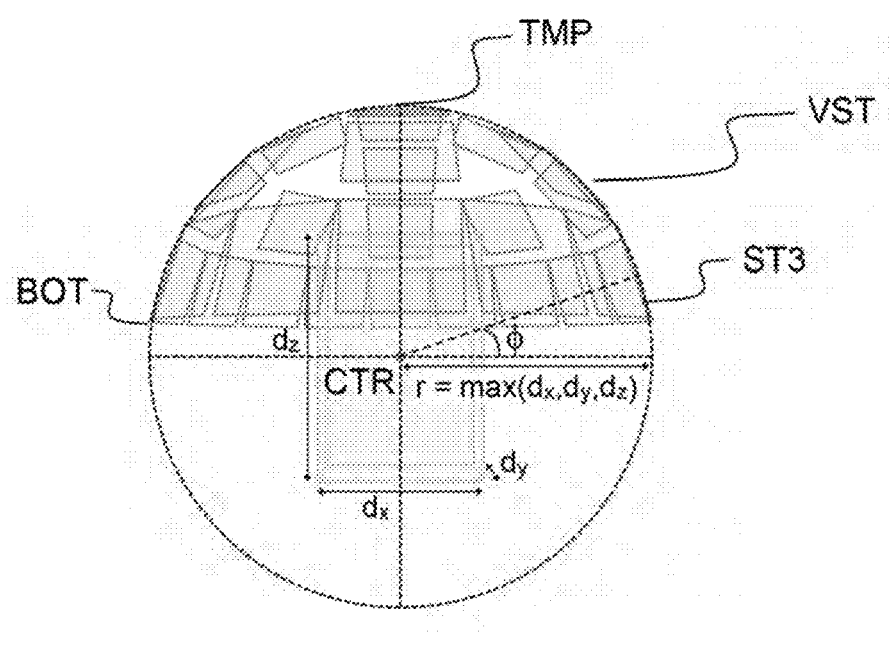
FIG. 5 illustrates an example of the virtual structure from a lateral view.

In an embodiment, the virtual structure VST is arranged as a half sphere (or a dome) covering the upper part of the virtual 3D box VBO, as illustrated by FIGS. 3, 4 and 5. The virtual structure VST does not exactly fit a half sphere since the tile are planar. FIG. 3 illustrates an example of the virtual structure from a perspective view, FIG. 4 illustrates a top view of the virtual structure, and FIG. 5 illustrates a lateral view.

Looking at the top view of the virtual structure VST (FIG. 4), the tiles comprise a first subset of tiles ST1 forming a cross having a center coinciding with the top-most point TMP of the virtual structure VST. The cross is aligned with lateral faces of the virtual 3D box VBO, which means that the top central tile is parallel to the upper face of the virtual 3D box VBO, and the orientation of the cross fits the orientation of the virtual 3D box VBO. The cross-like arrangement of the tiles enables the user to take pictures of the objects according to viewpoints which are usually used in computer aided design, which are: front, rear, top, left and right.

A second subset of tiles ST2 is arranged on the periphery of the virtual structure VST, at an intermediate height between the bottom BOT of the virtual structure VST and the topmost point TMP. The tiles of the second subset of tiles ST2 may be larger than the tiles of the first subset of tiles ST1. Thus, a limited number of tiles of the second subset of tiles ST2 is required in order to have quickly a complete set of frames. Four tiles of the second subset of tiles ST2 are aligned with the cross of the first subset of tiles ST1, so as to be aligned with the faces of the virtual 3D box VBO.

Lastly, a third subset of tiles ST3 is arranged on the periphery of the virtual structure VST, at the bottom BOT. The tiles of the third subset of tiles ST3 may be larger than the tiles of the second subset of tiles ST1, for the same reason as mentioned above. Four tiles of the third subset of tiles ST3 are aligned with the cross of the first subset of tiles ST1, so as to be aligned with the faces of the virtual 3D box VBO.

In an embodiment, there are respectively five (including the topmost tile), eight and sixteen tiles in the first, second and third subset of tiles (from highest to lowest, along the z-axis), amounting to twenty-nine tiles in the dome. Therefore, the user does not need to take a lot of pictures, without being at the expense of quality of reconstruction.

As it can be seen on FIG. 3, the first subset of tiles ST1, the second subset of tiles ST2 and the third subset of tiles ST3 may be spaced apart from each other by a constant polar angle $\theta$. The constant polar angle $\theta$ is measured between the center of the tiles which are aligned along the z-axis. The third subset of tiles ST3 is elevated with respect to the center CTR of the virtual 3D box VBO, so as to ease the acquisition of the frames by the user.

In an embodiment, the third subset of tiles ST3 is at an offset angle of $\phi=\pi/10$ with respect to the center CTR of the virtual 3D box VBO, so that the acquisition of the lowest tiles might not be tedious for the user. All subset of tiles are then uniformly distributed along the polar angle of the half sphere, leading to a constant polar spacing of $$\theta = \frac{1}{3}\left(\frac{\pi}{2} - \phi\right) = \frac{2\pi}{15}$$

between rows.

As it can be seen on FIG. 4, the tiles of a same subset are spaced apart from each other by a constant azimuthal angle. The constant azimuthal angle within the first, second and third subset of tiles is respectively π/2, π/4, and π/8.

As it can be seen on FIG. 5, the radius r of virtual structure VST, which corresponds to the radius of the circle of the dome basis, is set to the maximum dimension of the virtual 3D box VBO. Considering $d_x$, $d_y$, and $d_z$ the dimensions of the virtual 3D box VBO, r=max ($d_x$, $d_y$, $d_z$). As a consequence, even large objects can be scanned, since the virtual 3D box VBO is tailored to the size of the object, as well as the radius of the circle of the dome basis.

The pattern of virtual structure VST which is disclosed on FIGS. 3 to 5 allows viewing the object to scan from all sides, while giving good reconstruction results. Note that the bottom tiles are located above the plane where the object is lying, and they may be slightly slanted instead of being vertical since that would require the user to take an uncomfortable pose.

If a pure photogrammetry algorithm is chosen (instead of a carving algorithm), the dome would look denser and more regular, without such alignment constraints.

As an alternative to the aforementioned hemispherical shape of the virtual structure VST, the virtual structure may be arranged as a pattern which corresponds to the category of the object OBJ. The category of the object may be determined during step a): the user may provide information concerning the category of object of the 3D object, among a set of categories of articles (for example a vehicle, or a human face), or the category of the object may be automatically detected by pattern recognition.

Therefore, with a virtual structure VST which fits with the shape of the object, the complexity of the object is taken into account. The tiles are arranged so that as many details of the object as possible are captured. These tiles could vary in size, with different granularities, and could appear in several steps: a first set of tiles could be presented to capture the coarse features of the object, which is ideal for carving the overall shape of the object (for example a vehicle), and a second set of tiles, with a finer pattern, could be used to capture finer surface details of a subcomponent of the objet (for example the exterior rear-view mirror).

Whatever the kind of virtual structure VST (a dome or a pattern which corresponds to the category of the object), the user turns around the object OBJ, and the tiles are validated one by one, as depicted by FIG. 6: the image in the right corner illustrates the user being around the object and capturing frames by means of the camera CAM (of a hand-held device such as a tablet or a Smartphone), and the central image illustrates what the user sees on the screen of the hand-held device.

A temporary visual feedback on the tile which is pointed at, indicates that the corresponding frame is being acquired. The temporary feedback may be a predefined color, for example, or the blinking of the tile. Once the tile has been acquired, the temporary visual feedback is transformed into a permanent visual feedback, of another color for example. On FIG. 6, the tile which includes, on the screen, the head of the teddy bear has already been acquired, and now the user tries to acquire the tile which includes, on the screen, the abdomen of the teddy bear. By giving visual feedbacks to the user, the complexity of the input required by the reconstruction algorithm is hidden to the user and presented as an entertaining game of "tile hunt" instead.

Advantageously, it is ensured that the images will be usable by the reconstruction algorithm by making the user take pictures as sharp as possible, avoiding any blur.

For that, according to a first variant, a checking is made a priori (before the frame acquisition): during the step of frame acquisition, the amplitude of movement of the camera CAM and/or a speed of movement of the hand-held device CAM are measured. If the amplitude and/or the speed of movement exceed predetermined values, the capture of the frame is inhibited: therefore the frame is not acquired. The stability may be computed by means of the internal sensors of the handheld device, such as a gyroscope, an accelerometer, or a compass. The stability may also be computed by checking that the point located at the intersection between the direction of the camera and the tile being aimed at, stays inside a given positional range during the validation of the tile.

According to a second variant, checking is made a posteriori (after the frame acquisition): once the frame has been acquired, the sharpness of the captured frame is measured, and the frame is validated only if the frame is sharp enough. For the assessment of the frame sharpness, the Laplacian deviation algorithm may be used. The algorithm is explained in the article "*Diatom autofocusing in brightfield microscopy: a comparative study*", Pech-Pacheco et al., Proceedings 15th International Conference on Pattern Recognition. ICPR-2000).

Those conditions allow for a high level of effectiveness in the automatically captured frames, in the sense that they allow for a high level of exploitation by the subsequent reconstruction algorithm, as much by their localization as by the quality of the frame itself. All captures frames will be used with confidence, none will be discarded.

In some situations, all the sides of the object OBJ are not visible or not even accessible to the user. This is especially true if the object is so big that the user cannot see all its sides (especially the top view), or when the object to scan is placed against an obstacle (e.g. a wall) and cannot be moved. In such cases we should be able to handle partial acquisition.

In particular, in step a), it is determined whether the object OBJ has symmetrical parts. For that, the user may provide indications to the system, regarding the geometry of the object to scan, like planar surfaces, planes or axes of symmetry or axis of revolution. Since adding such indications to an object is not easy by using only the projected image on the screen, the user may interact with the virtual 3D box VBO so as to indicate that the object OBJ has symmetrical parts, after adjusting property the virtual 3D box VBO to fit the object to capture. Other indications provided by the user could also be the class of the object to scan, when the object is common (e.g. a chair, a bottle etc.). Then, the 3D reconstruction algorithm is implemented based on the validated tiles and based on the symmetry of the object.

Therefore, returning to FIG. 1, if there is some symmetry in the object, it is not necessary to validate all the tiles in order to reconstruct implementing the 3D reconstruction algorithm.

The inventive method can be performed by a suitably-programmed general-purpose computer or virtual reality system, possibly including a computer network, storing a suitable program in non-volatile form on a computer-readable medium such as a hard disk, a solid state disk or a CD-ROM and executing said program using its microprocessor(s) and memory.

Figure 7:
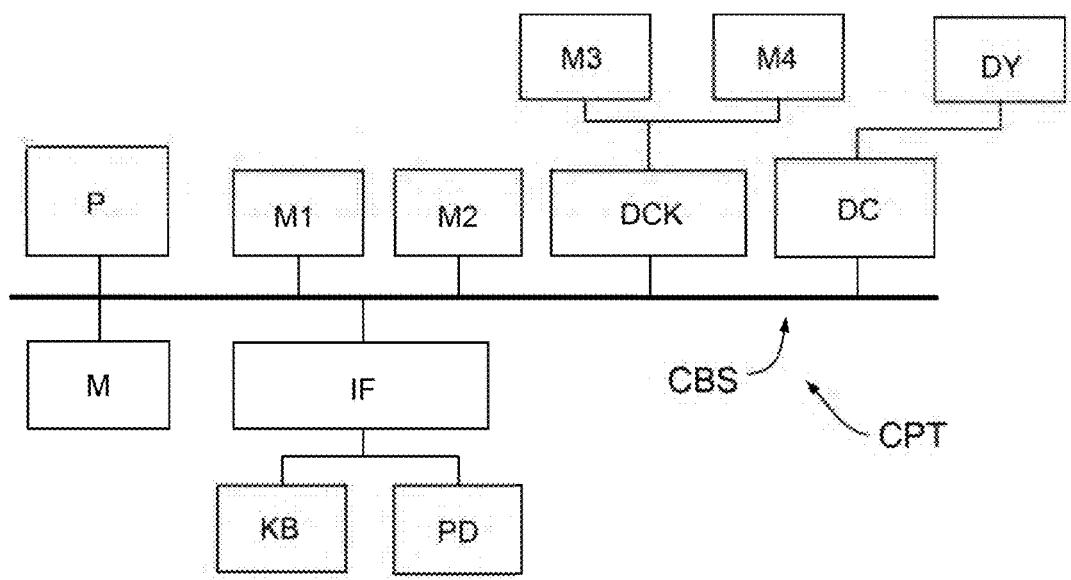
FIG. 7 illustrates a block diagram of a computer system suitable for carrying out a method according to the disclosure.

A hand-held device suitable for carrying out a method according to an exemplary embodiment is described with reference to FIG. 7. In FIG. 7, the hand-held device HHD includes a Central Processing Unit CPU which performs the method step described above while running an executable program, i.e. a set of computer-readable instructions, stored in a memory device such as RAM M1 or ROM M2, or stored remotely. The created 3D content may be stored in one of the memory devices, or stored remotely.

The claimed invention is not limited by the form of the computer-readable media on which the computer-readable instructions and/or the data structure of the inventive process are stored. For example, the instructions and files can be stored on CDs, DVDs, in FLASH memory, RAM, ROM, PROM, EPROM, EEPROM, hard disk or any other information processing device with which the computer communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with the Central Processing Unit CPU and an operating system such as Microsoft VISTA, Microsoft Windows 10, UNIX, Solaris, LINUX, Apple MAC-OS and other systems known to those skilled in the art.

The Central Processing Unit CPU can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the Central Processing Unit can be implemented as multiple processors cooperatively working to perform the computer-readable instructions of the inventive processes described above.

The hand-held device HHD in FIG. 7 also includes a network interface NI, such as an Intel Ethernet PRO network interface card from Intel Corporation of America, for interfacing with a network, such as a local area network (LAN), wide area network (WAN), the Internet and the like.

The hand-held device HHD includes a camera CAM for acquiring images of the environment, a screen DY for displaying the acquired images to the user, and sensors SNS for computing the 3D orientation and the 3D position of the hand held device HHD.

Any method steps described herein should be understood as representing modules, segments, or portions of code which include one or more executable instructions for Implementing specific logical functions or steps in the process, and alternate implementations are included within the scope of the exemplary embodiment.

The invention claimed is:

1. A computer-implemented method for 3D scanning of a real object with a camera having a 3D position, comprising:
   a) receiving, from the camera, an image of the real object;
   b) displaying on a screen, in an augmented reality view, the image of the real object enclosed within a virtual 3D box and, superimposed to the real object, a virtual structure made of a set of planar tiles, and being anchored to the virtual 3D box, each tile corresponding to a predetermined pose of the camera;
   c) detecting that a tile is pointed at with the camera;
   d) acquiring, from the camera, a frame of the virtual 3D box, thereby validating said tile, said frame being a projection of the virtual 3D box on the image;
   iterating steps a) to d) for different 3D positions of the camera, until a sufficient number of tiles is validated for scanning the real object; and
   e) implementing a 3D reconstruction algorithm with all captured frames,
   wherein the virtual structure is arranged as a half sphere covering the virtual 3D box,
   a radius of virtual structure is set to the maximum dimension of the virtual 3D box (VBO),
   the set of tiles includes, from a top-most point of the virtual structure to a bottom of the virtual structure (VST):
      a first subset of tiles forming a cross having a center coinciding with the top-most point of the virtual structure, said cross being aligned with lateral faces of the virtual 3D box,
      a second subset of tiles, which are partly aligned with the cross, and
      a third subset of tiles, which are partly aligned with the cross,
   the first, second and third subset of tiles being spaced apart from each other by a constant polar angle,
   the tiles being spaced apart from each other by a constant azimuthal angle within a same subset, and
   the third subset of tiles being elevated with respect to a center of the virtual 3D box.

2. The method according to claim 1, wherein step a) further comprises detecting, in the image, a horizontal plane where the real object lies, and instructing a user to position the virtual 3D box on said plane.

3. The method according to claim 1, wherein:
   the first, second and third subset of tiles respectively includes five, eight and sixteen tiles,
   the constant polar angle is $2\pi/15$,
   the constant azimuthal angle within the first, second and third subset of tiles is respectively $\pi/2$, $\pi/4$, and $\pi/8$, and
   the third subset of tiles is elevated by an angle of $\pi/10$ with respect to the center of the virtual 3D box.

4. The method according to claim 1, wherein step d) further comprises making the screen display a temporary visual feedback on the tile which is pointed at indicating that the corresponding frame is being acquired,
   the temporary visual feedback being transformed into a permanent visual feedback once the frame has been acquired.

5. The method according to claim 1, wherein step d) further comprises:
   casting a ray from the 3D position of the camera and in a direction of an optical axis of the camera (CAM),
   when detecting a collision between the ray and a non-validated tile, computing an angle between the ray and the normal direction of the non-validated tile, and
   validating the non-validated tile if the angle is smaller than a predetermined value.

6. The method according to claim 5, wherein the predetermined value is between 15 and 25 degrees.

7. The method according to claim 5, wherein the ray is periodically cast at a predetermined time interval.

8. The method according to claim 1, wherein step d) further comprises sub-steps of:

measuring an amplitude of movement of the camera and/or a speed of movement of a hand-held device, and inhibiting a capture of the frame if the amplitude and/or the speed of movement exceed predetermined values.

9. The method according to claim 1, wherein step d) further comprises sub-steps of:
measuring a captured frame sharpness, and
validating captured frame if the captured frame is sharp enough.

10. The method according to claim 1, wherein
step a) further comprises a sub-step of determining if the real object has symmetrical parts, and, in this case, validating only the tiles corresponding to parts of the real object which are different from each other,
the 3D reconstruction algorithm being implemented based on the captured frames and based on a symmetry of the real object.

11. The method according to claim 1, wherein the 3D reconstruction algorithm further comprises a space carving algorithm.

12. A non-transitory computer-readable data-storage medium containing computer-executable instructions that when executed by a computer system causes the computer system interfaced to a screen and a camera to carry out a method for 3D scanning of a real object with a camera having a 3D position comprising:
a) receiving, from the camera, an image of the real object;
b) displaying on a screen, in an augmented reality view, the image of the real object enclosed within a virtual 3D box and, superimposed to the real object, a virtual structure made of a set of planar tiles, and being anchored to the virtual 3D box, each tile corresponding to a predetermined pose of the camera;
c) detecting that a tile is pointed at with the camera;
d) acquiring, from the camera, a frame of the virtual 3D box, thereby validating said tile, said frame being a projection of the virtual 3D box on the image;
iterating steps a) to d) for different 3D positions of the camera, until a sufficient number of tiles is validated for scanning the real object; and
e) implementing a 3D reconstruction algorithm with all captured frames,
wherein the virtual structure is arranged as a half sphere covering the virtual 3D box,
a radius of virtual structure is set to the maximum dimension of the virtual 3D box (VBO),
the set of tiles includes, from a top-most point of the virtual structure to a bottom of the virtual structure (VST):
a first subset of tiles forming a cross having a center coinciding with the top-most point of the virtual structure, said cross being aligned with lateral faces of the virtual 3D box,
a second subset of tiles, which are partly aligned with the cross, and
a third subset of tiles, which are partly aligned with the cross,
the first, second and third subset of tiles being spaced apart from each other by a constant polar angle,
the tiles being spaced apart from each other by a constant azimuthal angle within a same subset, and
the third subset of tiles being elevated with respect to a center of the virtual 3D box.

13. A computer system comprising:
a processor coupled to a memory, a screen and a camera, the memory storing computer-executable instructions for 3D scanning of a real object with a camera having a 3D position that when executed by the processor cause the processor to be configured to:
a) receive, from the camera, an image of the real object,
b) display on a screen, in an augmented reality view, the image of the real object enclosed within a virtual 3D box and, superimposed to the real object, a virtual structure made of a set of planar tiles, and being anchored to the virtual 3D box, each tile corresponding to a predetermined pose of the camera,
c) detect that a tile is pointed at with the camera,
d) acquire, from the camera, a frame of the virtual 3D box, thereby validating said tile, said frame being a projection of the virtual 3D box on the image,
iterate a) to d) for different 3D positions of the camera, until a sufficient number of tiles is validated for scanning the real object, and
e) implement a 3D reconstruction algorithm with all captured frames,
wherein the virtual structure is arranged as a half sphere covering the virtual 3D box,
a radius of virtual structure is set to the maximum dimension of the virtual 3D box (VBO),
the set of tiles includes, from a top-most point of the virtual structure to a bottom of the virtual structure (VST):
a first subset of tiles forming a cross having a center coinciding with the top-most point of the virtual structure, said cross being aligned with lateral faces of the virtual 3D box,
a second subset of tiles, which are partly aligned with the cross, and
a third subset of tiles, which are partly aligned with the cross,
the first, second and third subset of tiles being spaced apart from each other by a constant polar angle,
the tiles being spaced apart from each other by a constant azimuthal angle within a same subset, and
the third subset of tiles being elevated with respect to a center of the virtual 3D box.

* * * * *